US012586814B2

(12) United States Patent
Kondo et al.

(10) Patent No.: US 12,586,814 B2
(45) Date of Patent: Mar. 24, 2026

(54) METHOD OF PRODUCING SULFIDE SOLID ELECTROLYTE AND METHOD FOR PRODUCING ELECTRODE MIXTURE

(71) Applicant: IDEMITSU KOSAN CO., LTD., Tokyo (JP)

(72) Inventors: Katsuhito Kondo, Chiba (JP); Atsushi Sato, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 566 days.

(21) Appl. No.: 18/088,108

(22) Filed: Dec. 23, 2022

(65) Prior Publication Data

US 2023/0207869 A1 Jun. 29, 2023

(30) Foreign Application Priority Data

Dec. 27, 2021 (JP) ................................. 2021-213215

(51) Int. Cl.
*H01M 10/0562* (2010.01)
*H01M 6/18* (2006.01)
(Continued)

(52) U.S. Cl.
CPC ....... *H01M 10/0562* (2013.01); *H01M 6/182* (2013.01); *H01M 6/185* (2013.01); *H01M 6/187* (2013.01); *H01M 10/0525* (2013.01); *H01M 50/70* (2021.01); *H01M 10/052* (2013.01); *H01M 2300/002* (2013.01);
(Continued)

(58) Field of Classification Search
CPC ......... H01M 10/0562; H01M 10/0525; H01M 10/052; H01M 6/182; H01M 6/185; H01M 6/187; H01M 50/70; H01M 2300/002; H01M 2300/0025; H01M 2300/008; H01M 2300/0068; Y02E 60/10
See application file for complete search history.

(56) References Cited

U.S. PATENT DOCUMENTS

2017/0352916 A1* 12/2017 Miyashita ......... H01M 10/0562
2019/0334199 A1* 10/2019 Homma .............. H01M 10/052
(Continued)

FOREIGN PATENT DOCUMENTS

JP     2005228570 A     8/2005
JP     2013201110 A     10/2013
(Continued)

OTHER PUBLICATIONS

WO_2014174829_A1 Translation (Year: 2014).*
(Continued)

*Primary Examiner* — Tong Guo
*Assistant Examiner* — Katherine J Metzger
(74) *Attorney, Agent, or Firm* — Element IP, PLC

(57) ABSTRACT

A method of producing a sulfide solid electrolyte and a method of producing an electrode mixture are described. The method of producing the sulfide solid electrolyte includes a step of mixing a raw material inclusion containing a lithium atom, a phosphorous atom, a sulfur atom, and a halogen atom with at least one lithium oxoacid salt of lithium nitrate, lithium nitrite, lithium silicate, lithium borate, and lithium carbonate. The sulfide solid electrolyte has high ion conductivity and excellent reactivity with an electrode active material, especially a positive electrode active material.

13 Claims, 1 Drawing Sheet

(51) Int. Cl.
 H01M 10/0525 (2010.01)
 H01M 50/70 (2021.01)
 H01M 10/052 (2010.01)
(52) U.S. Cl.
 CPC .............. *H01M 2300/0068* (2013.01); *H01M 2300/008* (2013.01); *Y02E 60/10* (2013.01)

(56) References Cited

U.S. PATENT DOCUMENTS

| | | | | |
|---|---|---|---|---|
| 2021/0242496 | A1* | 8/2021 | Shibata .................... | H01B 1/10 |
| 2021/0376377 | A1* | 12/2021 | Tanaka ............. | H01M 10/0525 |
| 2022/0294008 | A1* | 9/2022 | Kambara .................. | C03C 4/18 |
| 2023/0021458 | A1* | 1/2023 | Shibata ............ | C07F 9/650952 |
| 2023/0178799 | A1* | 6/2023 | Fujii .................. | H01M 10/052 |
| | | | | 429/322 |
| 2024/0154155 | A1* | 5/2024 | Nakayama ............... | H01B 1/06 |
| 2024/0266596 | A1 | 8/2024 | Kitamura et al. | |

FOREIGN PATENT DOCUMENTS

| | | | | |
|---|---|---|---|---|
| JP | 2016204219 A | 12/2016 | | |
| JP | 2022076417 A | 5/2022 | | |
| WO | WO-2014174829 A1 * | 10/2014 | ........ | H01M 10/0562 |
| WO | WO-2014208180 A1 | 12/2014 | | |
| WO | WO-2014208239 A1 | 12/2014 | | |
| WO | WO-2018003333 A1 | 1/2018 | | |
| WO | WO-2018047566 A1 * | 3/2018 | ............. | C01B 25/14 |
| WO | WO-2019003986 A1 * | 1/2019 | ........ | H01M 10/0562 |
| WO | WO-2023053609 A1 | 4/2023 | | |

OTHER PUBLICATIONS

WO2018047566A1_Description Translation (Year: 2018).*
WO_2019003986_A1 Original File—Text Format (Year: 2019).*
Office Action issued Jun. 3, 2025, in corresponding Japanese Patent Application No. 2021-213215 (with English translation), 5 pages.

* cited by examiner

[Fig. 1]
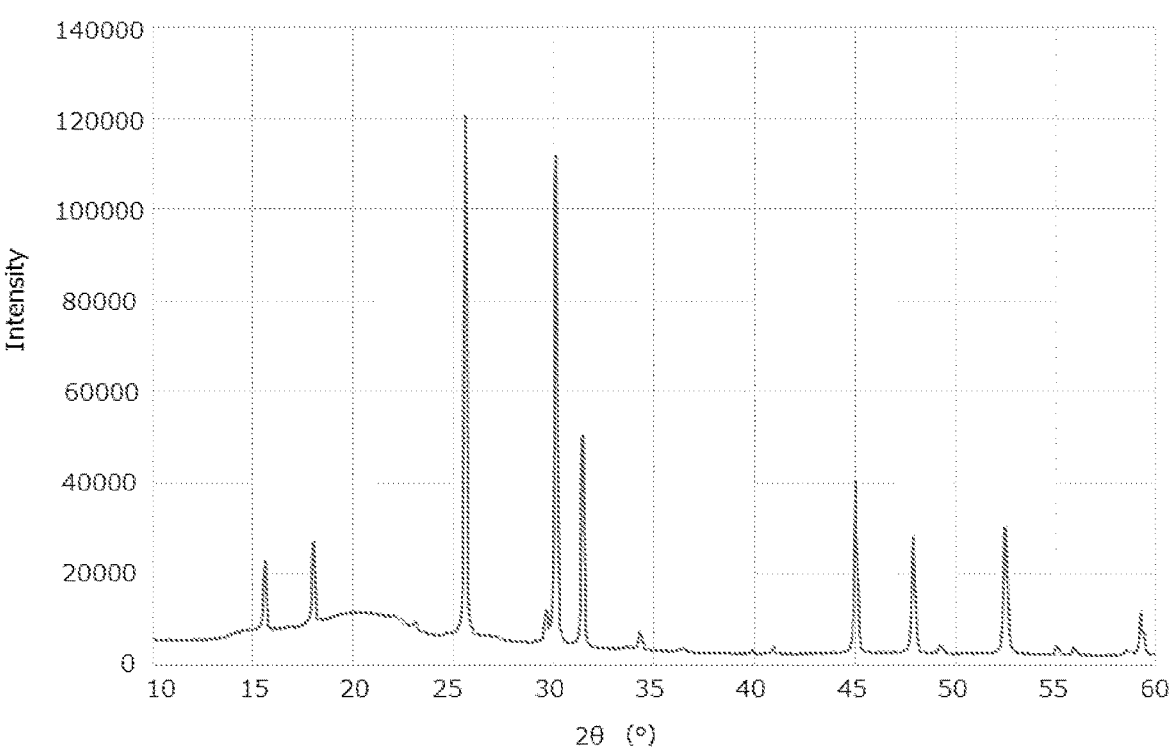
[Fig. 2]
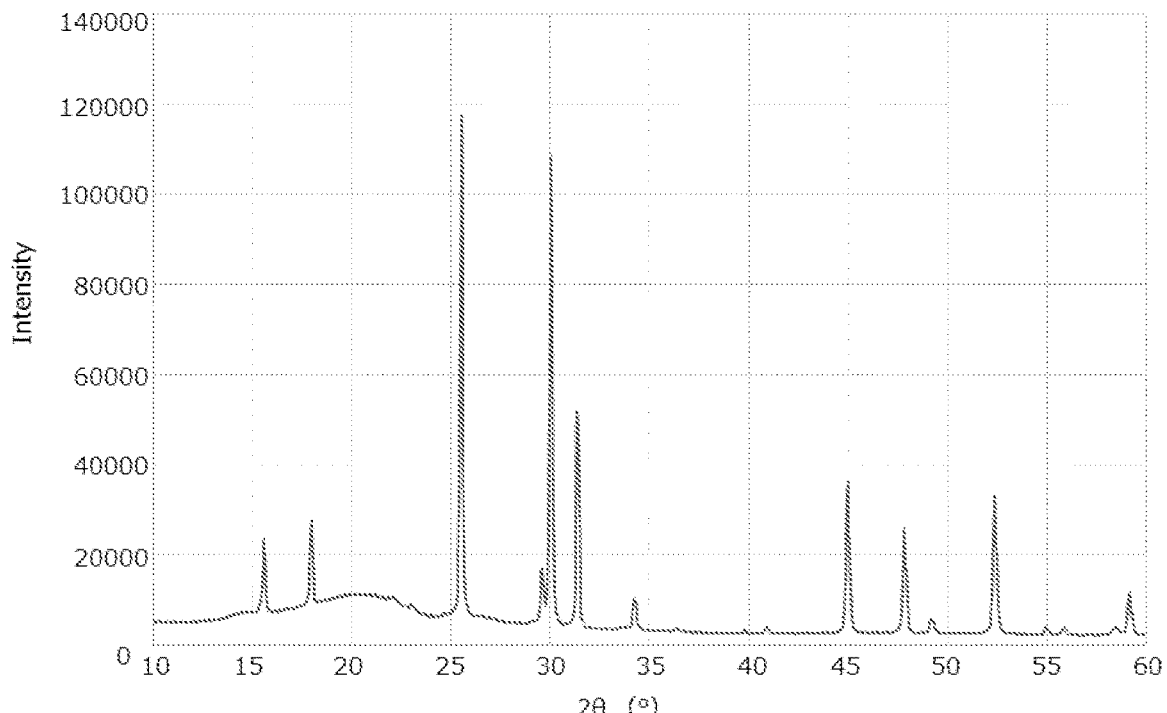

METHOD OF PRODUCING SULFIDE SOLID ELECTROLYTE AND METHOD FOR PRODUCING ELECTRODE MIXTURE

FIELD OF THE INVENTION

The present invention relates to a method of producing a sulfide solid electrolyte and a method of producing an electrode mixture.

BACKGROUND OF THE INVENTION

Recently, with the rapid spread of information-related devices and communication devices such as personal computers, video cameras, and mobile phones, the development of batteries used as power sources for the devices has been emphasized. In the related art, electrolyte solutions containing combustible organic solvents have been used in batteries used for such applications. A battery using an electrolyte containing an organic solvent as the electrolyte exhibits high ionic conductivity and is excellent in terms of performance as a battery, but a battery using an electrolyte containing an organic solvent as the electrolyte are liquid and flammable, so safety concerns such as leakage and ignition are raised when used as a battery. Recently, there has been a demand for higher capacity and higher output in various applications, and concerns about the safety of batteries using the electrolytes of the related art are growing. Therefore, by making the battery completely solid, it is possible to simplify the safety device without using flammable organic solvents in the battery, and batteries in which the electrolytic solution is replaced with a solid electrolyte layer are being developed because of their excellent manufacturing cost and productivity.

Various types of solid electrolytes have been developed as solid electrolytes used in the solid electrolyte layer. For example, PTL 1 discloses a $Li_2S—P_2S_5$-based solid electrolyte and a halogen atom-containing solid electrolyte, PTL 2 discloses a $Li_2S—P_2S_5—LiI$-based sulfide solid electrolyte, and PTLs 3 and 4 disclose a $Li_2S—P_2S_5—LiI—LiBr$-based sulfide solid electrolyte. As a solid electrolyte, PTL 5 discloses a solid electrolyte having an Argyrodite-type crystal structure. PTL 6 discloses a sulfide-based solid electrolyte in which the surface of a compound having a cubic Argyrodite-type crystal structure is coated with a compound having a non-Argyrodite-type crystal structure.

CITATION LIST

Patent Literature

[PTL 1] JP 2005-228570 A
[PTL 2] JP 2013-201110 A
[PTL 3] WO 2014/208180
[PTL 4] WO 2014/208239
[PTL 5] WO 2018/047566
[PTL 6] WO 2018/003333

SUMMARY OF THE INVENTION

Among the various solid electrolytes described above, sulfide solid electrolytes containing halogen atoms have attracted attention because of high ion conductivity. The excellent reactivity with an electrode active material is also important when forming an all-solid-state lithium battery.

The present invention has been made in view of such circumstances and provides a method of producing a sulfide solid electrolyte having a stable crystalline phase, which has high ion conductivity and excellent reactivity with a positive electrode active material, and an electrode mixture.

As a result of intensive studies aimed at solving the above problems, the inventors of the present disclosure have found that the problems may be solved by the inventions describe below.

1. A method of producing a sulfide solid electrolyte having a stable crystalline phase, the method including: mixing a raw material inclusion containing a lithium atom, a phosphorous atom, a sulfur atom, and a halogen atom with at least one lithium oxoacid salt selected from lithium nitrate, lithium nitrite, lithium silicate, lithium borate, and lithium carbonate.

2. A method of producing an electrode mixture, the method including: obtaining a sulfide solid electrolyte having a stable crystalline phase by mixing a raw material inclusion containing a lithium atom, a phosphorous atom, a sulfur atom, and a halogen atom with at least one lithium oxoacid salt selected from lithium nitrate, lithium nitrite, lithium silicate, lithium borate, and lithium carbonate; and mixing the sulfide solid electrolyte and an electrode active material.

According to the present invention, a method of producing a sulfide solid electrolyte having a stable crystalline phase, which has high ion conductivity and excellent reactivity with a positive electrode active material, and an electrode mixture.

BRIEF DESCRIPTION OF THE DRAWING

FIG. 1 is an X-ray diffraction spectrum of a crystalline solid electrolyte obtained in Example 2.

FIG. 2 is an X-ray diffraction spectrum of a crystalline solid electrolyte obtained in Example 3.

DETAILED DESCRIPTION OF THE INVENTION

Embodiments of the present invention (in this specification, the embodiment may be sometimes referred to as "present embodiment") are hereunder described. In this specification, numerical values of an upper limit and a lower limit according to numerical value ranges of "or more," "or less," and "XX to YY" are each a numerical value which may be arbitrarily combined, and numerical values of the section of examples may also be used as numerical values of an upper limit and a lower limit, respectively.

As used herein, the phrase "sulfide solid electrolyte" means an electrolyte containing sulfur atoms that remains solid at 25° C. under a nitrogen atmosphere. The solid electrolyte in the present embodiment is a solid electrolyte containing lithium atoms, phosphorus atoms, sulfur atoms, and halogen atoms and having ionic conductivity due to lithium atoms.

The phrase "sulfide solid electrolyte" includes both a crystalline solid electrolyte having a crystal structure and an amorphous solid electrolyte, and both may be obtained according to the production method of the present embodiment.

In this specification, a crystalline solid electrolyte is a solid electrolyte in which a peak derived from the solid electrolyte is observed in the X-ray diffraction pattern in X-ray diffraction measurement, and is a material in which the presence or absence of a peak derived from the raw material of the solid electrolyte is not relevant. That is, the crystalline solid electrolyte includes a crystal structure derived from the solid electrolyte, and may have a crystal structure partially derived from the solid electrolyte or a crystal structure entirely derived from the solid electrolyte. The crystalline solid electrolyte may partially contain an amorphous solid electrolyte as long as it has the X-ray diffraction pattern as described above. Therefore, crystalline solid electrolytes include so-called glass ceramics obtained by heating amorphous solid electrolytes to a crystallization temperature or higher.

In addition, in this specification, an amorphous solid electrolyte is one in which the X-ray diffraction pattern is substantially a halo pattern in which peaks other than the peaks derived from the material are not observed in the X-ray diffraction measurement, and means that it does not matter whether there is a peak derived from the raw material of the solid electrolyte.

The phrase "stable crystalline phase" generally means a crystalline phase that is thermodynamically in a state of low free energy under external conditions such as pressure and temperature, that is, a stable crystalline phase ("crystalline phase" is also referred to as a "crystal structure"). In this specification, among the above crystalline phases, the phrase "stable crystalline phase" generally means a stable crystalline phase (stable crystal structure) that exists without structural change in any temperature range from high temperature to low temperature, for example, from high temperature of 300° C. or less to low temperature including room temperature.

Regarding whether a sample has a "stable crystalline phase," for example, when the sample is heat treated at 300° C. for 10 hours in a tube sealed in an argon atmosphere at room temperature and normal pressure, and there is no change in the diffraction peak in X-ray diffraction analysis (within the error range in measurement) before and after the heat treatment, the sample may be determined to have a "stable crystalline phase."

Crystal structures that are "stable crystalline phases" include, for example, Argyrodite-type crystal structures and LGPS (LiGePS) crystal structures. The details of the crystal structures will be described later.

Knowledge Obtained by the Present Inventors to Conceive the Present Invention As a result of diligent studies aimed at solving the above problems, the inventors found the following matters and completed the present invention.

It is known that a compound having a polyanion (multivalent anion), for example, a compound such as lithium manganate (LMO) or lithium cobaltate (LCO), is used as a positive electrode active material in lithium batteries, and is used as a positive electrode in combination with a solid electrolyte such as a sulfide solid electrolyte. That is, it may be said that a compound having a polyanion (multivalent anion) is known to be used as an electrode by being mixed with a solid electrolyte.

The present inventors considered whether a compound having a polyanion (multivalent anion) may be removed by substituting the polyanion (multivalent anion) for the sulfur atoms present free in the solid electrolyte (hereinafter, "sulfur atom" includes-divalent sulfur ion, and may be simply referred to as "free sulfur atom") by using a compound having a polyanion (multivalent anion) as one of the raw materials of a sulfide solid electrolyte instead of mixing it with a solid electrolyte. When a sulfide solid electrolyte was prepared using a compound having a polyanion (multivalent anion), it was not limited to a polyanion (multivalent anion). In particular, by using a compound having a monovalent or multivalent anion having an oxygen atom, especially a lithium oxoacid salt, which is a lithium salt, high ionic conductivity was ensured. When the obtained sulfide solid electrolyte was used for an electrode, it was found that the sulfide solid electrolyte exhibited excellent reactivity with an electrode active material, and particularly, excellent reactivity with a positive electrode active material when used for a positive electrode.

A method of producing a sulfide solid electrolyte having a stable crystalline phase according to a first aspect of the present embodiment includes mixing a raw material inclusion containing a lithium atom, a phosphorus atom, a sulfur atom, and a halogen atom with at least one lithium oxoacid salt selected from lithium nitrate, lithium nitrite, lithium silicate, lithium borate, and lithium carbonate.

When a raw material inclusion containing each atom constituting a sulfide solid electrolyte is mixed with a specific lithium oxoacid salt, a reaction between the raw material inclusion and the lithium oxoacid salt proceeds, and a sulfide solid electrolyte having a stable crystalline phase is obtained.

By using the lithium oxoacid salt as one of the raw materials for the sulfide solid electrolyte, the oxo acid group of the lithium oxoacid salt oxidizes and substitutes sulfur in the solid electrolyte, and the lithium atom contained in the lithium oxoacid salt contributes as a lithium atom constituting the sulfide solid electrolyte. Therefore, the decrease in ionic conductivity is suppressed. As a result, it is considered that a sulfide solid electrolyte having high ionic conductivity is obtained.

Further, although the lithium oxoacid salt used in the present embodiment is different from a compound having a polyanion, such as lithium manganate (LMO) or lithium cobaltate (LCO), which is a positive electrode active material used for the positive electrode of a lithium battery, it is common in that the lithium oxoacid salt has an anion containing an oxygen atom. Therefore, when the obtained sulfide solid electrolyte is used for an electrode, especially for a positive electrode, it is considered that the effect of excellent reactivity with the positive electrode active material is also obtained.

As described above, the sulfide solid electrolyte having a stable crystalline phase obtained by the production method of the present embodiment has excellent reactivity with the electrode active material, that is, any of the positive electrode active material and the negative electrode active material and in particular, exhibits excellent reactivity with the positive electrode active material. In this specification, since the sulfide solid electrolyte having a stable crystalline phase obtained by the production method of the present embodiment is particularly excellent in reactivity with the positive electrode active material, it is only mentioned that it has excellent reactivity with the positive electrode active material. However, as described above, needless to say, it is also excellent in reactivity with electrode active materials including negative electrode active materials.

A method of producing a sulfide solid electrolyte having a stable crystalline phase according to a second aspect of the present embodiment is a production method in which the lithium oxoacid salt is lithium carbonate.

The lithium oxoacid salt used in the production method of the present embodiment is at least one compound selected from lithium nitrate, lithium nitrite, lithium silicate, lithium borate, and lithium carbonate. Among these, lithium carbonate exhibits high ionic conductivity and excellent reactivity with electrode active materials, particularly positive electrode active materials.

A method of producing a sulfide solid electrolyte having a stable crystalline phase according to third to fifth aspects of the present embodiment is a production method in which the raw material inclusion contains lithium sulfide, the raw material inclusion contains phosphorus sulfide, and the raw material inclusion contains at least one halogen-containing compound selected from lithium halide or elemental halogen.

By adopting lithium sulfide as a source of ionic conductivity of the sulfide solid electrolyte and as a source of ion atoms, phosphorus sulfide as a source of sulfur atoms and phosphorus atoms, and lithium halide and elemental halogen as sources of halogen atoms, it is possible to more efficiently obtain a sulfide solid electrolyte having a stable crystalline phase, and having high ionic conductivity and excellent reactivity with the positive electrode active material.

A method of producing a sulfide solid electrolyte having a stable crystalline phase according to a sixth aspect of the present embodiment is a production method in which the number of moles of the lithium oxoacid salt with respect to 100 mol parts of lithium atoms contained in the raw material inclusion is 1.0 mol parts or more and 10.0 mol parts or less.

By setting the amount of the lithium oxoacid salt used within the above-described range, the reaction between the raw material inclusion and the lithium oxoacid salt is easily promoted, and it becomes easier to obtain both high ionic conductivity and excellent reactivity with the positive electrode active material.

A method of producing a sulfide solid electrolyte having a stable crystalline phase according to a seventh aspect of the present embodiment is a production method in which the raw material inclusion and the lithium oxoacid salt satisfy the following formulas (1) to (3).

$$4.8 \leq \text{lithium atom/phosphorous atom (molar ratio)} \leq 5.6 \tag{1}$$

$$3.8 \leq \text{sulfur atom/phosphorous atom (molar ratio)} \leq 4.4 \tag{2}$$

$$1.2 \leq \text{halogen atom/phosphorous atom (molar ratio)} \leq 2.0 \tag{3}$$

As in a sixth aspect, the amount of lithium oxoacid salt used is defined. By setting the amount of lithium oxoacid salt used within the above-described ranges, the reaction between the raw material inclusion and the lithium oxoacid salt may be easily promoted, and both high ionic conductivity and excellent reactivity with the positive electrode active material may be easily obtained.

A method of producing a sulfide solid electrolyte having a stable crystalline phase according to an eighth aspect of the present embodiment is a method for performing the mixing using a pulverizer.

Since the raw material inclusion and the lithium oxoacid salt are uniformly mixed by mixing the raw material inclusion and the lithium oxoacid salt with a pulverizer, the reactions are promoted, making it possible to efficiently produce a homogeneous sulfide solid electrolyte. In addition, the homogeneous sulfide solid electrolyte stably exhibits ionic conductivity and reactivity with the positive electrode active material.

A method of producing a sulfide solid electrolyte having a stable crystalline phase according to a ninth aspect of the present embodiment is a production method further including heating the mixture obtained by the mixing.

By further including heating, the oxidative substitution of sulfur in the sulfide solid electrolyte by the oxoacid group of the lithium oxoacid salt proceeds more efficiently, which suppresses the decrease in ionic conductivity. Thus, it becomes easier to obtain a sulfide solid electrolyte with higher ionic conductivity. Further, according to the production method of the present embodiment, by adjusting the blending ratio of the raw material inclusion and the lithium oxoacid salt, it is possible to obtain a sulfide solid electrolyte having a stable crystalline phase such as, for example, an Argyrodite-type crystal structure or an LPGS type crystal structure.

A method of producing a sulfide solid electrolyte according to a tenth aspect of the present embodiment is a production method in which the sulfide solid electrolyte is a sulfide solid electrolyte having an Argyrodite-type crystal structure.

As described above, according to the production method of the present embodiment, sulfide solid electrolytes having various structures may be obtained by adjusting the blending ratio of the raw material inclusion and the lithium oxoacid salt. Among them, a sulfide solid electrolyte having an Argyrodite-type crystal structure as a stable crystalline phase has high ion conductivity, and is effective when used in a lithium battery.

Further, when a sulfide solid electrolyte having an Argyrodite-type crystal structure is used as a stable crystalline phase, the reactivity with the lithium oxoacid salt is high, and oxidative substitution of sulfur by the oxoacid group of the lithium oxoacid salt is likely to proceed. Thus, it is possible to produce a sulfide solid electrolyte having high ionic conductivity and excellent reactivity with the positive electrode active material.

A method of producing an electrode mixture according to an eleventh aspect of the present embodiment is a production method that includes: obtaining a sulfide solid electrolyte having a stable crystalline phase by mixing raw material inclusions containing a lithium atom, a phosphorus atom, a sulfur atom, and a halogen atom with at least one lithium oxoacid salt selected from lithium nitrate, lithium nitrite, lithium silicate, lithium borate, and lithium carbonate; and mixing the sulfide solid electrolyte and an electrode active material.

In the method of producing an electrode mixture according to the eleventh aspect, an electrode mixture is obtained by mixing an electrode active material with a sulfide solid electrolyte having a stable crystalline phase obtained by the method of producing a sulfide solid electrolyte according to the first aspect. As described later, in the sulfide solid electrolyte having a stable crystalline phase obtained by the method of producing a sulfide solid electrolyte according to the first aspect, the ratio of the $Li_3PO_4$ crystal structure in the total crystal is 1.0 mol % or more and 5.0 mol % or less, and excellent effects in terms of both ionic conductivity and reactivity with the positive electrode active material may be exhibited. In the sulfide solid electrolyte, the ratio of the $Li_3PO_4$ crystal structure within the above-described predetermined range may be easily implemented by producing the sulfide solid electrolyte according to the method of producing the sulfide solid electrolyte of the present embodiment. That is, the method of producing the electrode mixture of the present embodiment is configured to include the method of producing the sulfide solid electrolyte of the present embodiment as described above, so that the electrode mixture containing the sulfide solid electrolyte having the stable crystalline phase may be easily obtained.

The fact that the sulfide solid electrolyte having a stable crystalline phase obtained by the method of producing a sulfide solid electrolyte of the present embodiment has a $Li_3PO_4$ crystal structure is confirmed by the X-ray diffraction spectrum of the sulfide solid electrolyte obtained in the examples described later. A peak (5 to 9 ppm) attributed to the $Li_3PO_4$ crystal structure is also confirmed by the $^{31}P$-NMR spectrum, and the ratio thereof is also confirmed from the spectrum.

As described above, in the method of producing a sulfide solid electrolyte of the present embodiment, by using a lithium oxoacid salt as one of the raw materials, the anion moiety (oxoacid group) contained in the lithium oxoacid salt oxidizes and replaces sulfur in the sulfide solid electrolyte, resulting in the incorporation into a structure of the sulfide solid electrolyte. It may be believed that the oxygen atoms contained in the incorporated anion moiety, the lithium atoms contained in the lithium oxoacid salt, and the lithium atoms and phosphorus atoms contained in the raw material inclusions constitute the $Li_3PO_4$ crystal structure.

As described above, the $Li_3PO_4$ crystal structure is formed by oxidative substitution of sulfur in the sulfide solid electrolyte by the oxoacid group of the lithium oxoacid salt. Thus, the sulfide solid electrolyte used in the method of producing the electrode mixture of the present embodiment has the $Li_3PO_4$ crystal structure in a predetermined ratio, so that the main crystal of the sulfide solid electrolyte is not destroyed. Since the lithium atoms contained in the lithium oxoacid salt are also likely to efficiently contribute as lithium atoms constituting the sulfide solid electrolyte, the ionic conductivity is maintained as it is, resulting in a high ionic conductivity. Further, since the sulfide solid electrolyte has the $Li_3PO_4$ crystal structure derived from the lithium oxoacid salt, it is considered that the reactivity with the positive electrode active material is also excellent.

In the electrode mixture obtained by the method of producing the electrode mixture of the present embodiment, the sulfide solid electrolyte and the electrode active material are present in a favorable state. Since the excellent performance of the sulfide solid electrolyte having a stable crystalline phase obtained by the production method of the present embodiment may be exhibited as it is, the quality thereof is high.

A method of producing an electrode mixture according to a twelfth aspect of the present embodiment is obtaining an electrode mixture by heating the mixture obtained by mixing the sulfide solid electrolyte having the stable crystalline phase.

As in the method of producing the sulfide solid electrolyte according to the ninth aspect, by further including heating, the oxidative substitution of sulfur in the sulfide solid electrolyte by the oxoacid group of the lithium oxoacid salt proceeds more efficiently. Thus, the decrease in ionic conductivity is suppressed and it becomes easier to obtain a sulfide solid electrolyte with high ionic conductivity.

A method of producing an electrode mixture according to a thirteenth aspect of the present embodiment is such that the sulfide solid electrolyte has an Argyrodite-type crystal structure.

As in the tenth aspect, the use of a sulfide solid electrolyte having an Argyrodite-type crystal structure as a stable crystalline phase may suppress a decrease in high ionic conductivity, which is effective when used in a lithium battery. In addition, since the sulfide solid electrolyte used in the electrode mixture has excellent reactivity with the positive electrode active material, and the excellent performance of the sulfide solid electrolyte having a stable crystalline phase may be exhibited as it is, the electrode mixture obtained by the production method of the present embodiment has high quality.

Method of Producing Sulfide Solid Electrolyte Having Stable Crystalline Phase The method of producing a sulfide solid electrolyte having a stable crystalline phase according to the present embodiment will be described below in more detail in accordance with the above-described aspects.

Raw Material Inclusion

The raw material inclusions used in the production method of the present embodiment contain lithium atoms, phosphorus atoms, sulfur atoms, and halogen atoms. The raw material inclusions may contain a single type of compound or plural types of compounds. Considering the ease of obtaining a compound, it is preferable to contain plural types of compounds, and plural types of compounds containing at least one atom selected from lithium atoms, phosphorus atoms, sulfur atoms, and halogen atoms may be used in combination.

Compounds that may be used as raw materials contained in raw material inclusions include, for example, alkali metal sulfides such as lithium sulfide, sodium sulfide, potassium sulfide, rubidium sulfide, and cesium sulfide; alkali metal halides such as lithium halides such as lithium fluoride, lithium chloride, lithium bromide, and lithium iodide, and sodium halides such as sodium iodide, sodium fluoride, sodium chloride, and sodium bromide; phosphorus sulfides such as phosphorus trisulfide ($P_2S_3$) and phosphorus pentasulfide ($P_2S_5$); phosphorous halides such as various phosphorus fluorides ($PF_3$, $PF_5$), various phosphorus chlorides ($PCl_3$, $PCl_5$, $P_2Cl_4$), various phosphorus bromides ($PBr_3$, $PBr_5$), and various phosphorus iodides ($PI_3$, $P_2I_4$); thiophosphoryl halides such as thiophosphoryl fluoride ($PSF_3$), thiophosphoryl chloride ($PSCl_3$), thiophosphoryl bromide ($PSBr_3$), thiophosphoryl iodide ($PSI_3$), thiophosphoryl dichloride fluoride ($PSCl_2F$), and thiophosphoryl dibromide fluoride ($PSBr_2F$); and a compound including at least two atoms selected from the above-described four types of atoms, and elemental halogens such as fluorine ($F_2$), chlorine ($Cl_2$), bromine ($Br_2$), and iodine ($I_2$).

As for a compound that may be used as a raw material other than the above, for example, a compound that contains at least one atom selected from the above-described four types of atoms and that contains atoms other than the four types of atoms may also be used. Examples of such a compound include: lithium compounds such as lithium oxide, lithium hydroxide, and lithium carbonate; metal sulfides such as silicon sulfide, germanium sulfide, boron sulfide, gallium sulfide, tin sulfide (SnS, $SnS_2$), aluminum sulfide, and zinc sulfide; phosphoric acid compounds such as sodium phosphate and lithium phosphate; metal halides such as aluminum halides, silicon halides, germanium halides, arsenic halides, selenium halides, tin halides, antimony halides, tellurium halides, and bismuth halides; and phosphorus oxyhalides such as phosphorus oxychloride ($POCl_3$) and phosphorus oxybromide ($POBr_3$).

In the present embodiment, from the viewpoint of easily obtaining a sulfide solid electrolyte having a stable crystalline phase and having high ionic conductivity, among the alkali metal atoms, lithium atoms and sodium atoms are preferred, and lithium atoms are more preferred. Among the halogen atoms, chlorine atoms, bromine atoms, and iodine atoms are preferred, and chlorine atoms are more preferred. Further, the atoms may be used alone or in combination.

From the same point of view, examples of compounds that may be used as raw materials include alkali metal sulfides such as lithium sulfide and sodium sulfide, and phosphorus sulfides such as phosphorus trisulfide ($P_2S_3$) and phosphorus pentasulfide ($P_2S_5$).

As for the compounds containing halogen, lithium halides such as lithium fluoride, lithium chloride, lithium bromide, and lithium iodide; and elemental halogens such as fluorine ($F_2$), chlorine ($Cl_2$), bromine ($Br_2$), and iodine ($I_2$) are preferred. Using lithium halides and elemental halogens alone or in combination, that is, at least one selected from lithium halides and elemental halogens is preferred. When lithium halides or elemental halogens are used alone, or when lithium halides and elemental halogens are used in combination, it goes without saying that multiple types of lithium halides and multiple types of elemental halogens may be used.

Among alkali metal sulfides, lithium sulfide is preferred. Among phosphorus sulfides, diphosphorus pentasulfide is preferred. Among elemental halogens, chlorine ($Cl_2$), bromine ($Br_2$), and iodine ($I_2$) are preferred, and chlorine ($Cl_2$) and bromine ($Br_2$) are more preferred. Among lithium halides, lithium chloride, lithium bromide, and lithium iodide are preferred, and lithium chloride and lithium bromide are more preferred. Further, when using lithium halides, it is especially preferable to use lithium chloride and lithium bromide in combination.

As for combinations of compounds that may be used as raw materials, for example, a combination of lithium sulfide, diphosphorus pentasulfide, and lithium halide, a combination of lithium sulfide, diphosphorus pentasulfide, and elemental halogen, and a combination of lithium sulfide, diphosphorus pentasulfide, lithium halide, and elemental halogen are preferred. Among the combinations, the combination of lithium sulfide, diphosphorus pentasulfide, and lithium halide is preferred.

In the present embodiment, it is possible to use the above-exemplified materials alone or in combination.

In the present embodiment, compounds that may be used as raw materials also include solid electrolytes such as $Li_3PS_4$ containing $PS_4$ units. Examples of solid electrolytes that may be adopted in the compound used as a raw material include an amorphous sulfide solid electrolyte having a $Li_3PS_4$ structure as a molecular structure (hereinafter, also referred to as "amorphous $Li_3PS_4$") or a crystalline sulfide solid electrolyte (hereinafter, also referred to as "crystalline $Li_3PS_4$"). Considering obtaining high ionic conductivity, an amorphous sulfide solid electrolyte or a crystalline sulfide solid electrolyte not containing the $Li_4P_2S_7$ structure is preferred, and an amorphous sulfide solid electrolyte is more preferred.

The solid electrolytes may be produced by, for example, the production method in the related art such as mechanical milling, slurry, and melt quenching using lithium sulfide and phosphorus sulfide. A commercial item may also be used.

When lithium sulfide is used as the alkali metal-containing compound, the lithium sulfide is preferably particles.

The average particle size ($D_{50}$) of the lithium sulfide particles is preferably 10 μm or more and 2000 μm or less, more preferably 30 μm or more and 1500 μm or less, and still more preferably 50 μm or more and 1000 μm or less. In this specification, the average particle size ($D_{50}$) is the particle size that reaches 50% of the total when a particle size distribution cumulative curve is drawn and the particles are successively integrated from the smallest particle size. The volume distribution refers to the average particle size that may be measured, for example, using a laser diffraction/scattering particle size distribution analyzer. Among the raw materials exemplified above, the solid raw materials preferably have the same average particle size as the lithium sulfide particles, that is, within the same range as the average particle size of the lithium sulfide particles.

When lithium sulfide, diphosphorus pentasulfide, and lithium halide are used as raw materials, from the viewpoint of obtaining higher ionic conductivity, the ratio of lithium sulfide to the total of lithium sulfide and diphosphorus pentasulfide is preferably 60 mol % or more, more preferably 65 mol % or more, and still more preferably 70 mol % or more, the upper limit is preferably 85 mol % or less, more preferably 80 mol % or less, and still more preferably 78 mol % or less.

When using lithium sulfide, diphosphorus pentasulfide, lithium halide, and other raw materials that are used as necessary, the content of lithium sulfide and diphosphorus pentasulfide with respect to the total of these is preferably 45 mol % or more, more preferably 47 mol % or more, and still more preferably 50 mol % or more, and the upper limit is preferably 80 mol % or less, more preferably 65 mol % or less, and still more preferably 58 mol % or less.

Further, when using lithium chloride and lithium bromide in combination as lithium halides, from the viewpoint of obtaining higher ionic conductivity, the ratio of lithium chloride to the total of lithium chloride and lithium bromide is preferably 1 mol % or more, more preferably 20 mol % or more, still more preferably 40 mol % or more, and yet still more preferably 50 mol % or more, and the upper limit is preferably 99 mol % or less, more preferably 90 mol % or less, still more preferably 80 mol % or less, and yet still more preferably 70 mol % or less.

When the above solid electrolyte is employed as the compound, the content of the amorphous sulfide solid electrolyte having the $Li_3PS_4$ structure with respect to the total of the raw material is preferably 60 mol % to 90 mol %, more preferably 62 mol % to 80 mol %, and still more preferably 65 mol % to 75 mol %.

Lithium Oxoacid Salt

The lithium oxoacid salt used in the production method of the present embodiment is at least one compound selected from lithium nitrate, lithium nitrite, lithium silicate, lithium borate, and lithium carbonate.

The lithium oxoacid salts have the property of easily reacting with sulfur, and are likely to easily oxidatively replace sulfur in the sulfide solid electrolyte. Therefore, by adopting the lithium oxoacid salts in the production method of the present embodiment, it is possible to suppress the decrease in ionic conductivity and easily obtain a sulfide solid electrolyte having high ionic conductivity.

As for the lithium oxoacid salt, lithium nitrate, lithium nitrite, and lithium carbonate are preferred among the above, and lithium carbonate is more preferred, from the viewpoint of suppressing the decrease in ionic conductivity.

In the present embodiment, as for the lithium oxoacid salt, one of the above may be used alone, or a combination of two or more of them may be used.

In terms of the number of mols of the lithium oxoacid salt per 100 mol parts of lithium atoms contained in the raw material inclusion, the amount of the lithium oxoacid salt used is preferably 1.0 mol part or more, more preferably 3.0 mol parts or more, still more preferably 5.0 mol parts or more, and yet still more preferably 7.5 mol parts or more, and the upper limit is preferably 10.0 mol parts or less, more preferably 9.5 mol parts or less, still more preferably 9.0 mol parts or less, and yet still more preferably 8.8 mol parts or less.

As for the amount of the lithium oxoacid salt used, it is preferable to use the raw material inclusion and the lithium oxoacid salt to satisfy the following formulas (1) to (3).

$$4.8 \leq \text{lithium atom/phosphorous atom (molar ratio)} \leq 5.6 \qquad (1)$$

$$3.8 \leq \text{sulfur atom/phosphorous atom (molar ratio)} \leq 4.4 \qquad (2)$$

$$1.2 \leq \text{halogen atom/phosphorous atom (molar ratio)} \leq 2.0 \qquad (3)$$

By using the amount of the lithium oxoacid salt to satisfy the above formulas (1) to (3), the reaction between the raw material inclusion and the lithium oxoacid salt is easily promoted, and it becomes easier to obtain excellent effects on both high ionic conductivity and reactivity with the positive electrode active material.

The lower limit of the formula (1) is preferably 4.9 and more preferably 5.0, and the upper limit thereof is preferably 5.5 and more preferably 5.4.

The lower limit of the formula (2) is preferably 3.9 and more preferably 4.0, and the upper limit thereof is preferably 4.3 and more preferably 4.2.

The lower limit of the formula (3) is preferably 1.3 and more preferably 1.5, and the upper limit thereof is preferably 1.9 and more preferably 1.7.

Mixing

The production method of the present embodiment includes mixing the raw material inclusion and the lithium oxoacid salt. By mixing the raw material inclusion and the lithium oxoacid salt, the reaction between the raw material inclusion and the lithium oxoacid salt proceeds, and a sulfide solid electrolyte is obtained as a mixture. Here, when the raw material inclusion contains plural types of compounds, the reaction between the raw material inclusion and the lithium oxoacid salt also includes the reaction between the raw material inclusions.

The raw material inclusion and the lithium oxoacid salt may be mixed using, for example, a mixer. Mixing may also be performed using a stirrer or a pulverizer. This is because even when a stirrer is used, the compounds used as raw materials may be mixed, and the pulverizer causes the compounds used as raw materials to be pulverized, but at the same time, mixing also occurs. That is, in the production method of the present embodiment, the reaction between the raw material inclusion and the lithium oxoacid salt proceeds at least by mixing, but may also proceed by stirring, mixing, pulverizing, or a combination of any of these. In the production method of the present embodiment, it is particularly preferable to use a pulverizer from the viewpoint of further promoting the reaction between the raw material inclusion and the lithium oxoacid salt.

The stirrer and mixer include, for example, a mechanical stirrer-type mixer that is equipped with stirring blades in a reaction tank and capable of performing stirring (mixing by stirring, which may also be called stirring and mixing). Examples of the mechanical stirrer-type mixer include high-speed stirring mixers and double-arm mixers. Further, the high-speed stirrer-type mixer includes a vertical shaft rotary mixer and a horizontal shaft rotary mixer, and either type of mixer may be used.

The shapes of the stirring blades used in the mechanical stirrer-type mixer include a blade type, an arm type, an anchor type, a paddle type, a full zone type, a ribbon type, a multi-blade type, a double arm type, a shovel type, a twin blade type, a flat blade type, and a C-shaped blade type. From the viewpoint of promoting the reaction of raw materials more efficiently, the shovel type, the flat blade type, the C type blade type, the anchor type, the paddle type, and the full zone type are preferable, and the anchor type, the paddle type, and the full zone type are more preferable.

When a mechanical stirrer-type mixer is used, the rotation speed of the stirring blades may be appropriately adjusted according to the volume and temperature of the fluid in the reaction tank and the shape of the stirring blades, and may be usually 5 rpm or more and 400 rpm or less although not particularly limited. From the viewpoint of promoting the reaction of the raw materials more efficiently, the rotation speed is preferably 10 rpm or more and 300 rpm or less, more preferably 15 rpm or more and 250 rpm or less, and still more preferably 20 rpm or more and 200 rpm or less.

The temperature conditions for mixing using a mixer are not particularly limited, and are usually −30° C. to 120° C., preferably −10° C. to 100° C., more preferably 0° C. to 80° C., and still more preferably 10° C. to 60° C. Further, from the viewpoint of making the dispersion state of the raw materials more uniform and promoting the reaction, the mixing time is usually 0.1 to 500 hours, preferably 1 to 450 hours, more preferably 10 to 425 hours, still more preferably 20 to 400 hours, and yet still more preferably 40 to 375 hours.

A method of performing mixing accompanied by pulverization using a pulverizer has been employed as a solid-phase method (i.e., a mechanical milling method) in the related art. As the pulverizer, for example, a medium-type pulverizer using a pulverizing medium may be used.

The medium-type pulverizer is broadly classified into a container-driven pulverizer and a medium-agitation pulverizer. Examples of the container-driven pulverizer include a stirring tank, a pulverizing tank, or a combination of these tanks, such as a ball mill and a bead mill. Examples of the medium agitation pulverizer include an impact pulverizer such as a cutter mill, a hammer mill, or a pin mill; a tower-type pulverizer such as a tower mill; a stirring tank-type pulverizer such as an attritor, an aquamizer, or a sand grinder; a circulation tank-type pulverizer such as a visco mill or a pearl mill; a circulation tube-type pulverizer; an annular-type pulverizer such as a coball mill; a continuous dynamic pulverizer; and various pulverizers such as a uni-axial or multiaxial kneader. Among them, considering the ease of adjusting the particle size of the resulting sulfide, the ball mill and bead mill exemplified as the container-driven pulverizer are preferred, and the planetary type is particularly preferred.

The pulverizers may be appropriately selected according to the desired scale, etc. For a relatively small scale, a container-driven pulverizer such as a ball mill or bead mill may be used, and for a relatively large scale or mass production, other types of pulverizers may be used.

Further, in the case of a liquid state or a slurry state accompanied by a liquid such as a solvent at the time of mixing, a wet pulverizer capable of coping with wet pulverization is preferred.

As for the wet pulverizer, a wet bead mill, a wet ball mill, and a wet vibrating mill are typically exemplified. A wet bead mill using beads as pulverizing media is preferred because the conditions for the pulverizing operation may be freely adjusted and it is easy to handle smaller particle sizes.

In addition, it is also possible to use a dry pulverizer such as a dry medium pulverizer such as a dry bead mill, a dry ball mill, or a dry vibration mill, and a dry non-medium pulverizer such as a jet mill.

When the object to be mixed is in a liquid state or a slurry state, a flow-type pulverizer capable of circulating and operating as necessary may be used. Specifically, a pulverizer may be mentioned that circulates between a pulverizer (pulverization mixer) for pulverizing slurry and a temperature holding tank (reaction container).

The sizes of the beads and balls used in the ball mill and bead mill may be appropriately selected according to the desired particle size or throughput. For example, the diameter of the beads is usually 0.05 mmφ or more, preferably 0.1 mmφ or more, and more preferably 0.3 mmφ or more, and the upper limit is usually 5.0 mmφ or less, preferably 3.0 mmφ or less, and more preferably 2.0 mmφ or less. The diameter of the ball is usually 2.0 mmφ or more, preferably 2.5 mmφ or more, and more preferably 3.0 mmφ or more, and the upper limit is usually 20.0 mmφ or less, preferably 15.0 mmφ or less, and more preferably 10.0 mmφ or less.

Materials include, for example, metals such as stainless steel, chrome steel, and tungsten carbide; ceramics such as zirconia and silicon nitride; and minerals such as agate.

When using a ball mill or a bead mill, since the number of rotations varies depending on the scale of processing, the number thereof may not be generalized. However, the number of rotations is usually 10 rpm or more, preferably 20 rpm or more, and more preferably 50 rpm or more, and the upper limit is usually 1,000 rpm or less, preferably 900 rpm or less, more preferably 800 rpm or less, and still more preferably 700 rpm or less.

In addition, since the pulverization time in this case varies depending on the scale of processing, it may not be generalized. However, the pulverization time is usually 0.5 hours or more, preferably 1 hour or more, more preferably 5 hours or more, and still more preferably 10 hours or more, and the upper limit is usually 100 hours or less, preferably 72 hours or less, more preferably 48 hours or less, and still more preferably 36 hours or less.

By selecting the size and material of the medium (beads, balls) to be used, the number of rotations of a rotor, and time, it is possible to perform mixing, stirring, pulverization, or a combination of any of the processes, and it is possible to adjust the particle size of the sulfide.

Solvent

A solvent may be added and mixed when mixing the raw material inclusion and the lithium oxoacid salt. As for the solvent, various solvents that are widely called organic solvents may be used.

As for the solvent, it is possible to widely employ solvents that have been used in the related art in the production of solid electrolytes. For example, hydrocarbon solvents such as aliphatic hydrocarbon solvents, alicyclic hydrocarbon solvents, and aromatic hydrocarbon solvents may be mentioned.

Examples of aliphatic hydrocarbons include hexane, pentane, 2-ethylhexane, heptane, octane, decane, undecane, dodecane, and tridecane, and alicyclic hydrocarbons include cyclohexane and methylcyclohexane, and aromatic hydrocarbon solvents include benzene, toluene, xylene, mesitylene, ethylbenzene, tert-butylbenzene, trifluoromethylbenzene, and nitrobenzene.

In addition to the above-described hydrocarbon solvents, solvents containing atoms other than carbon atoms and hydrogen atoms, for example, heteroatoms such as nitrogen atoms, oxygen atoms, sulfur atoms, and halogen atoms, are also included. Preferred examples include ether solvents, ester solvents, alcohol solvents, aldehyde solvents, and ketone solvents containing an oxygen atom as a heteroatom.

Preferred examples of ether solvents include: aliphatic ethers such as dimethyl ether, diethyl ether, tert-butyl methyl ether, dimethoxymethane, dimethoxyethane, diethylene glycol dimethyl ether (diglyme), triethylene oxide glycol dimethyl ether (triglyme), diethylene glycol, and triethylene glycol; alicyclic ethers such as ethylene oxide, propylene oxide, tetrahydrofuran, tetrahydropyran, dimethoxytetrahydrofuran, cyclopentylmethyl ether, and dioxane; heterocyclic ethers such as furan, benzofuran, and benzopyran; and aromatic ethers such as methylphenyl ether (anisole), ethylphenyl ether, dibenzyl ether, and diphenyl ether.

Preferred examples of ester solvents include: methyl formate, ethyl formate, methyl acetate, ethyl acetate, propyl acetate, and isopropyl acetate; aliphatic esters such as methyl propionate, ethyl propionate, dimethyl oxalate, diethyl oxalate, dimethyl malonate, diethyl malonate, dimethyl succinate, and diethyl succinate; alicyclic esters such as methyl cyclohexanecarboxylate, ethyl cyclohexanecarboxylate, and dimethyl cyclohexanedicarboxylate; heterocyclic esters such as methyl pyridinecarboxylate, methyl pyrimidinecarboxylate, acetolactone, propiolactone, butyrolactone, and valerolactone; and aromatic esters such as methyl benzoate, ethyl benzoate, dimethyl phthalate, diethyl phthalate, butylbenzyl phthalate, dicyclohexyl phthalate, trimethyl trimellitate, and triethyl trimellitate.

Further, alcohol solvents such as ethanol and butanol; aldehyde solvents such as formaldehyde, acetaldehyde, and dimethylformamide; and ketone solvents such as acetone and methyl ethyl ketone are also preferred.

Solvents containing a nitrogen atom as a heteroatom include solvents containing a nitrogen atom-containing group such as an amino group, an amide group, a nitro group, or a nitrile group.

For example, solvents having an amino group include: aliphatic amines such as ethylenediamine, diaminopropane, dimethylethylenediamine, diethylethylenediamine, dimethyldiaminopropane, tetramethyldiaminomethane, tetramethylethylenediamine (TMEDA), and tetramethyldiaminopropane (TMPDA); alicyclic amines such as cyclopropanediamine, cyclohexanediamine, and bisaminomethylcyclohexane; heterocyclic amines such as isophoronediamine, piperazine, dipiperidylpropane, and dimethylpiperazine; and aromatic amines such as phenyldiamine, tolylenediamine, naphthalenediamine, methylphenylenediamine, dimethylnaphthalenediamine, dimethylphenylenediamine, tetramethylphenylenediamine, and tetramethylnaphthalenediamine.

Solvents containing nitrogen atoms such as dimethylformamide, acetonitrile, acrylonitrile, and nitrobenzene are also preferred.

Preferred examples of solvents containing halogen atoms as heteroatoms include dichloromethane, chlorobenzene, trifluoromethylbenzene, chlorobenzene, chlorotoluene, and bromobenzene.

Preferred examples of solvents containing sulfur atoms include dimethyl sulfoxide and carbon disulfide.

When a solvent is used, the amount of the solvent used is preferably 1.0 L or more, more preferably 2.0 L or more, still more preferably 2.5 L or more, and yet still more preferably 3.0 L or more per 1 kg of the total amount of the raw material inclusion and the lithium oxoacid salt, and the upper limit is preferably 30 L or less, more preferably 25 L or less, still more preferably 20 L or less, and yet still more preferably 15 L or less. When the amount of the solvent used is within the above-described ranges, the reaction may proceed efficiently.

Obtained by Mixing

The mixture obtained by performing the above mixing contains a sulfide solid electrolyte.

The sulfide solid electrolyte contained in the mixture obtained by mixing includes a crystalline sulfide solid electrolyte having a stable crystalline phase, an amorphous sulfide solid electrolyte, and other compounds contained in the raw material inclusion. In order to obtain a sulfide solid electrolyte having a stable crystalline phase, it is possible to adjust, for example, the above mixing conditions.

The adjustment according to the mixing conditions may not be said unconditionally because it varies depending on the blending ratio of the raw material inclusion and the lithium oxoacid salt, that is, the composition and structure of the desired sulfide solid electrolyte. However, examples of such an adjustment includes selection of a mixer, stirrer, and pulverizer, adjustment of rotation speed, and adjustment by mixing time, and temperature conditions. For example, using a mixer or stirrer makes it easier to obtain an amorphous sulfide solid electrolyte, and using a pulverizer makes it easier to obtain a crystalline sulfide solid electrolyte. Therefore, it is preferable to use a pulverizer in the production method of the present embodiment.

In addition, when a pulverizer is used, pulverization for a long time (e.g., 15 hours or more) makes it easier to obtain a crystalline sulfide solid electrolyte, and pulverization for a short time makes it easier to obtain an amorphous sulfide solid electrolyte. Therefore, in the production method of the present embodiment, it is preferable to use a pulverizer to pulverize for a relatively long period of time. The mixing time at the time of using a pulverizer is as described above. Even when a mixer or a stirrer is used, it goes without saying that a sulfide solid electrolyte having a stable crystalline phase may be obtained when the mixing time is set as described above.

Regarding the blending ratio of the raw material inclusion and the lithium oxoacid salt, that is, the composition and structure of the desired sulfide solid electrolyte, for example, when a crystalline sulfide solid electrolyte has an Argyrodite-type crystal structure as a stable crystalline phase (to be described later), an amorphous sulfide solid electrolyte may not be obtained (strictly speaking, the amorphous sulfide solid electrolyte does not exist). Meanwhile, when the crystalline sulfide solid electrolyte has an LPGS-type crystal structure, it may be an amorphous sulfide solid electrolyte or a crystalline sulfide solid electrolyte by adjusting the mixing conditions. In this way, whether to use an amorphous sulfide solid electrolyte or a crystalline sulfide solid electrolyte may be adjusted by the blending ratio of the raw material inclusions and the lithium oxoacid salt.

Details such as the composition and structure of the sulfide solid electrolyte obtained by the above mixing will be described later.

Drying

When the mixing is performed using a solvent, it may include drying the fluid (usually a slurry) obtained by the mixing after the mixing. The fluid obtained by mixing contains the above-described sulfide solid electrolyte obtained by mixing the raw material inclusion and the lithium oxoacid salt, and the solvent. A sulfide solid electrolyte may be obtained by removing the solvent by drying from the fluid obtained by mixing.

Drying may be performed on the fluid obtained by mixing at a temperature depending on the type of solvent.

In addition, drying may be performed usually at 5° C. to 130° C., preferably 10° C. to 100° C., more preferably 15° C. to 70° C., still more preferably room temperature (23° C.) (e.g., room temperature±5° C.) under reduced pressure using a vacuum pump (vacuum drying) to volatilize the solvent.

Drying may be performed by filtering the fluid using a glass filter, solid-liquid separation by decantation, or solid-liquid separation using a centrifugal separator. When a solvent is used, a sulfide solid electrolyte may be obtained by solid-liquid separation. Further, the solid-liquid separation and the above reduced pressure drying (vacuum drying) may be combined.

Specifically, the solid-liquid separation may be easily performed by filtering using a glass filter having a decantation of removing the supernatant solvent after transferring the fluid to a container and precipitating the sulfide, for example, a pore size of about 10 to 200 μm, preferably 20 to 150 μm.

Heating

The method of producing a sulfide solid electrolyte of the present embodiment preferably includes further heating the mixture obtained by the above mixing. By further heating the mixture, the oxidative substitution of sulfur in the sulfide solid electrolyte by the oxoacid group of the lithium oxoacid salt proceeds more efficiently, so that the decrease in ionic conductivity is suppressed and it becomes easier to obtain a sulfide solid electrolyte with high ionic conductivity.

When an amorphous sulfide solid electrolyte is obtained by the above mixing, a crystalline sulfide solid electrolyte may be obtained by heating, and when a crystalline sulfide solid electrolyte is obtained by the above mixing, the degree of crystallinity may be further improved. Further, when a compound contained in the raw material inclusion remains in the mixture, the compound contributes to the formation of the sulfide solid electrolyte.

When a solvent is used in mixing, the solvent may be removed by heating without drying to obtain a sulfide solid electrolyte. Depending on the heating conditions, an amorphous sulfide solid electrolyte or a crystalline sulfide solid electrolyte may be obtained.

The heating temperature may be determined in consideration of the composition and structure of the crystalline sulfide solid electrolyte, and the easiness of reaction between the lithium oxoacid salt and sulfur atoms.

When considering the composition and structure of the crystalline sulfide solid electrolyte, the temperature may be set to be higher than the crystallization temperature according to the composition and structure. For example, an amorphous sulfide solid electrolyte corresponding to the crystalline sulfide solid electrolyte is subjected to differential thermal analysis (DTA) using a differential thermal analysis apparatus (DTA apparatus) at a temperature increase of 10° C./min, and the temperature of the peak top of the exothermic peak observed on the lowest temperature side is defined as the crystallization temperature, and from this point, it is preferably set to 5° C. or higher, more preferably 10° C. or higher, and still more preferably 20° C. or higher.

When considering the ease of reaction between the lithium oxoacid salt and the sulfur atom, the temperature at which the sulfur atom may react is preferably set to 5° C. or higher, more preferably 15° C. or higher, and still more preferably 30° C. or higher.

In the production method of the present embodiment, the reaction between the lithium oxoacid salt and the sulfur atom is emphasized. Therefore, when the temperature at which the lithium oxoacid salt may react with the sulfur atom is higher than the crystallization temperature, the heating temperature may be determined based on the temperature at which the lithium oxoacid salt may react with the sulfur atom. When a crystalline sulfide solid electrolyte is desired, the heating temperature may be determined based on the higher temperature between the crystallization temperature and the temperature at which the lithium oxoacid salt may react with the sulfur atoms.

In the production method of the present embodiment, by determining the heating temperature as described above, the oxidative substitution of sulfur in the sulfide solid electrolyte by the oxoacid groups of the lithium oxoacid salt proceeds more efficiently. Therefore, a decrease in conductivity is suppressed, and a sulfide solid electrolyte having high ionic conductivity may be easily obtained. Further, at the above temperature, a crystalline sulfide solid electrolyte may be obtained efficiently.

Since the heating temperature varies depending on the composition and structure of the crystalline sulfide solid electrolyte to be obtained, and the type of lithium oxoacid salt, the heating temperature may not be defined unconditionally. However, the heating temperature is usually preferably 130° C. or higher, more preferably 135° C. or higher, and still more preferably 140° C. or higher, and although not particularly limited, the upper limit is preferably 600° C. or lower, more preferably 550° C. or lower, and still more preferably 500° C. or lower.

When obtaining an amorphous sulfide solid electrolyte, the heating temperature may be determined according to the structure of the crystalline sulfide solid electrolyte obtained by heating the amorphous sulfide solid electrolyte. Specifically, starting from the above crystallization temperature, the heating temperature is preferably 5° C. or lower, more preferably 10° C. or lower, and still more preferably 20° C. or lower, and although not particularly limited, the lower limit is preferably −40° C. or higher at the peak top of the exothermic peak observed on the lowest temperature side.

By setting the temperature within such a range, an amorphous sulfide solid electrolyte may be obtained more efficiently and reliably. The heating temperature for obtaining the amorphous sulfide solid electrolyte depends on the composition and structure of the crystalline sulfide solid electrolyte to be obtained, and thus, may not be defined unconditionally. However, the heating temperature is usually preferably 135° C. or lower, more preferably 130° C. or lower, and still more preferably 125° C. or lower, and although not particularly limited, the lower limit is preferably 90° C. or higher, more preferably 100° C. or higher, and still more preferably 105° C. or higher.

The heating time varies depending on the composition and structure of the crystalline sulfide solid electrolyte to be obtained, and thus, may not be defined unconditionally. However, the heating time is preferably 1 minute or more, more preferably 10 minutes or more, still more preferably 30 minutes or more, and yet still more preferably one hour or more. The upper limit of the heating time is preferably 24 hours or less, more preferably 10 hours or less, still more preferably 5 hours or less, and yet still more preferably 3 hours or less. When the heating time is set within the above-described ranges, since the oxidative substitution of sulfur in the sulfide solid electrolyte by the oxoacid group of the lithium oxoacid salt proceeds more efficiently, the decrease in ionic conductivity is suppressed, thereby making it easier to obtain a sulfide solid electrolyte with high ionic conductivity. The above heating time is applicable to both the crystalline sulfide solid electrolyte and the amorphous sulfide solid electrolyte.

Heating is preferably performed in an inert gas atmosphere (e.g., a nitrogen atmosphere, an argon atmosphere) or a reduced pressure atmosphere (particularly in vacuum). The inert gas atmosphere may be an inert gas atmosphere containing hydrogen gas at a certain concentration, for example, the concentration of hydrogen gas in air flow processing (to be described later). This is because deterioration (e.g., oxidation) of crystalline sulfide may be suppressed. The heating method is not particularly limited, and examples thereof include a method using a hot plate, a vacuum heating device, an argon gas atmosphere furnace, and a firing furnace. Industrially, a horizontal dryer including a heating unit and a feeding mechanism, and a horizontal vibrating fluidized dryer may be used, and the dryer may be selected according to the amount of heat to be processed.

Sulfide Solid Electrolyte

The sulfide solid electrolyte obtained by the above production method is a sulfide solid electrolyte having a stable crystalline phase, and may be referred to as a crystalline sulfide solid electrolyte.

The crystalline sulfide solid electrolyte obtained by the production method of the present embodiment preferably has a crystal structure of a stable crystalline phase constituted by atoms including the following lithium atoms, sulfur atoms, phosphorus atoms, and halogen atoms. The crystalline sulfide solid electrolyte may be so-called glass ceramics obtained by heating an amorphous sulfide solid electrolyte to a crystallization temperature or higher.

As described above, the crystal structure of the stable crystalline phase typically includes an Argyrodite-type crystal structure and an LPGS-type crystal structure, and is constituted by atoms including a lithium atom, a sulfur atom, a phosphorus atom, and a halogen atom. The Argyrodite-type crystal structure is preferred because of its high ionic conductivity. When a compound containing a germanium atom, for example, germanium sulfide or germanium halide, is used as the raw material inclusion, the crystalline sulfide solid electrolyte obtained by the production method of the present embodiment may have an LPGS-type crystal structure.

The sulfide solid electrolyte obtained by the production method of the present embodiment has a stable crystalline phase, and preferred examples thereof include the sulfide solid electrolyte having the following Argyrodite-type crystal structure.

The Argyrodite-type crystal structure having a structural framework of $Li_7PS_6$ and represented by the composition formula $Li_{7-x-2y}PS_{6-x-y}Cl_x$ ($0.8 \leq x \leq 1.7$, $0 \leq y \leq -0.25x+0.5$) is preferably a cubic system, and has a peak appearing at a position of mainly $2\theta = 15.5°$, $18.0°$, $25.0°$, $30.0°$, $31.4°$, $45.3°$, $47.0°$, and $52.0°$ in X-ray diffraction measurement using CuKα rays. Further, the Argyrodite-type crystal structure represented by the composition formula $Li_{7-x}PS_{6-x}Ha_x$ (Ha is Cl or Br, x is preferably 0.2 to 1.8) is preferably a cubic system, and has a peak appearing at a position of mainly $2\theta = 15.5°$, $18.0°$, $25.0°$, $30.0°$, $31.4°$, $45.3°$, $47.0°$, and $52.0°$ in X-ray diffraction measurement using CuKα rays.

In this specification, the peak position may be shifted within a range of ±0.5°.

The sulfide solid electrolyte obtained by the production method of the present embodiment may have an LPGS-type crystal structure as a stable crystalline phase. The LPGS-type crystal structure is a crystal structure having lithium atoms, phosphorus atoms, germanium atoms, and sulfur atoms, and may be formed when a compound containing germanium atoms is used as one of the raw material inclusions as described above.

The LPGS-type crystal structure is specifically a thio-LISICON Region II-type crystal structure represented by the composition formula $Li_{4-x}Ge_{1-x}P_xS_4$ ($0<x<1$) or the crystal structure similar thereto. The LPGS-type crystal structure has a peak appearing at a position of mainly $2\theta=12.4°, 14.4°, 17.4°, 20.2°, 23.9°, 26.9°, 29.6°, 41.5°$, and $47.4°$ in X-ray diffraction measurement using CuKα rays.

The sulfide solid electrolyte having a stable crystalline phase obtained by the production method of the present embodiment may have a stable crystalline phase, that is, an Argyrodite-type crystal structure or an LPGS-type crystal structure. Considering the inclusion of lithium atoms, phosphorous atoms, sulfur atoms, and halogen atoms, and obtaining higher ionic conductivity, the sulfide solid electrolyte preferably has the above Argyrodite-type crystal structure, more preferably as a main crystal.

In this specification, the phrase "has . . . as a main crystal" means that the proportion of the target crystal structure in all crystals is 80.0% or more, preferably 90.0% or more, more preferably 95.0% or more, and still more preferably 96.0% or more. Further, the crystalline sulfide solid electrolyte obtained by the production method of the present embodiment preferably does not contain crystalline $Li_3PS_4$ ($\beta$-$Li_3PS_4$) from the viewpoint of obtaining higher ion conductivity.

As described above, the sulfide solid electrolyte having a stable crystalline phase obtained by the production method of the present embodiment is preferably a sulfide solid electrolyte having an Argyrodite-type crystal structure, and more preferably has an Argyrodite-type crystal structure as a main crystal.

The sulfide solid electrolyte preferably has an Argyrodite-type crystal structure as a main crystal.

Among the above sulfide solid electrolytes having a stable crystalline phase, since the sulfide solid electrolyte having an Argyrodite-type crystal structure has high ion conductivity, it is particularly preferred to produce a sulfide solid electrolyte having an Argyrodite-type crystal structure.

In addition, since the sulfide solid electrolyte having an Argyrodite-type crystal structure as a stable crystalline phase has high reactivity with lithium oxoacid salts, the sulfide solid electrolyte having an Argyrodite-type crystal structure as a stable crystalline phase has high ionic conductivity and facilitates production of a sulfide solid electrolyte having excellent reactivity with a positive electrode active material.

The shape of the crystalline sulfide solid electrolyte is not particularly limited, but may be, for example, particulate. The average particle diameter ($D_{50}$) of the particulate crystalline sulfide solid electrolyte may be exemplified in the ranges of 0.01 μm to 500 μm and 0.1 to 200 μm.

$Li_3PO_4$ Crystal Structure

The sulfide solid electrolyte having a stable crystalline phase obtained by the production method of the present embodiment has a $Li_3PO_4$ crystal structure in addition to the main crystals. As described above, the $Li_3PO_4$ crystal structure may be considered to be formed by oxidative substitution of sulfur in the sulfide solid electrolyte by the oxo acid group of the lithium oxoacid salt, lithium atoms in the lithium oxoacid salt and oxygen atoms in the anion moiety, and lithium atoms and phosphorus atoms in the sulfide solid electrolyte.

The ratio of the $Li_3PO_4$ crystal structure to the total crystal is 1.0 mol % or more and 5.0 mol % or less as described above. The sulfide solid electrolyte having a stable crystalline phase obtained by the production method of the present embodiment has a $Li_3PO_4$ crystal structure in a predetermined ratio, and as described above, has high ionic conductivity and excellent reactivity with the positive electrode active material.

From the viewpoint of more efficiently increasing the ionic conductivity and improving the reactivity with the positive electrode active material, the ratio of the $Li_3PO_4$ crystal structure to the total crystal is preferably 1.2 mol % or more, more preferably 1.5 mol % or more, and still more preferably 2.0 mol % or more, and the upper limit is preferably 4.5 mol % or less, more preferably 4.0 mol % or less, and still more preferably 3.5 mol % or less.

The ratio of the $Li_3PO_4$ crystal structure to the total crystal is a value that may be calculated by the method described in the examples.

Other Properties of Sulfide Solid Electrolyte Having Stable Crystalline Phase The ion conductivity of the sulfide solid electrolyte having a stable crystalline phase obtained by the production method of the present embodiment is usually 1.0 mS/cm or more, and furthermore, 2.0 mS/cm or more, 4.0 mS/cm or more, 5.0 mS/cm or more, 6.5 mS/cm or more, 7.5 mS/cm or more, 8.5 mS/cm or more, 9.5 mS/cm or more.

Use of Sulfide Solid Electrolyte

A sulfide solid electrolyte having a stable crystalline phase obtained by the production method of the present embodiment has high ionic conductivity and excellent battery performance, and is therefore suitable for use in batteries. The sulfide solid electrolyte is particularly suitable to employ lithium atoms as the conductive species.

In addition, the sulfide solid electrolyte obtained by the production method of the present embodiment has excellent reactivity with electrode active materials, particularly positive electrode active materials. Therefore, the sulfide solid electrolyte is suitably used as an electrode mixture in combination with an electrode active material, and may be used in a positive electrode layer, a negative electrode layer, or an electrolyte layer, and is particularly preferably used in a positive electrode layer. Each layer may be manufactured by a known method.

Production Method of Electrode Mixture

The method of producing the electrode mixture of the present embodiment includes: obtaining a sulfide solid electrolyte having a stable crystalline phase by mixing a raw material inclusion containing a lithium atom, a phosphorus atom, a sulfur atom, and a halogen atom with at least one lithium oxoacid salt selected from lithium nitrate, lithium nitrite, lithium silicate, lithium borate, and lithium carbonate; and mixing the sulfide solid electrolyte and an electrode active material. Here, obtaining a sulfide solid electrolyte having a stable crystalline phase in the method of producing an electrode mixture of the present embodiment corresponds to the above method of producing a sulfide solid electrolyte of the present embodiment. Therefore, the method of producing an electrode mixture of the present embodiment includes mixing a sulfide solid electrolyte having a stable crystalline phase obtained by the method of producing the sulfide solid electrolyte of the present embodiment with an electrode active material.

Obtaining a sulfide solid electrolyte having a stable crystalline phase in the method of producing the electrode mixture of the present embodiment is as described above for the method of producing the sulfide solid electrolyte of the present embodiment. Therefore, the fact that it is preferable to heat the mixture obtained by the above mixing is also as explained in the method of producing the sulfide solid electrolyte of the present embodiment.

The electrode mixture is produced by mixing the sulfide solid electrolyte having a stable crystalline phase obtained by the above-described production method of the present embodiment, the electrode active material, and the above-described other components that are used as necessary.

For mixing, the apparatus such as the pulverizer or stirrer which has been described as an apparatus that may be used for mixing the raw material inclusion and the lithium oxoacid salt, may be used. The pulverizer is preferably a stirring tank-type pulverizer or a container-driven pulverizer, more preferably a tumbling mill, a ball mill, or a bead mill. The stirrer is preferably a high-speed agitating mixer, more preferably a high-speed swirling thin-film agitator.

The heating may be performed in the same manner as the above heating of the mixture.

Considering the case where a conductive material and a binder are used in the production of the electrode mixture, it is preferable to use a pulverizer, and among these, a stirring tank-type pulverizer, particularly a tumbling mill, is preferred.

Electrode Mixture

The electrode mixture obtained by the method of producing the electrode mixture of the present embodiment includes a sulfide solid electrolyte having a stable crystalline phase obtained by the production method of the present embodiment, that is, a sulfide solid electrolyte having a stable crystalline phase in which a lithium atom, a phosphorus atom, a sulfur atom, and a halogen atom are contained and the ratio of the $Li_3PO_4$ crystal structure to the total crystal is 1.0 mol % or more and 5.0 mol % or less, and an electrode active material. The sulfide solid electrolyte having a stable crystalline phase obtained by the production method of the present embodiment is suitably used as an electrode mixture in combination with an electrode active material as described above.

Hereinafter, descriptions will be made on the method of producing the electrode mixture of the present embodiment, and the electrode active material and other components used in the electrode mixture obtained by the production method.

Electrode Active Material

As for the electrode active material, a positive electrode active material and a negative electrode active material are respectively adopted depending on whether the electrode mixture is used for the positive electrode or the negative electrode.

As for the positive electrode active material, in relation to the negative electrode active material, any material may be used without particular limitation as long as it may promote the battery chemical reaction accompanied by the movement of lithium ions caused by atoms employed as atoms that exhibit ionic conductivity, preferably lithium atoms. Examples of positive electrode active materials capable of intercalating and deintercalating lithium ions include oxide-based positive electrode active materials and sulfide-based positive electrode active materials.

Preferred examples of oxide-based positive electrode active materials include lithium-containing transition metal composite oxides such as lithium manganate (LMO), lithium cobalt oxide (LCO), lithium nickel manganese cobalt oxide (NMC), lithium nickel cobalt aluminum oxide (NCA), lithium nickel cobalt oxide (LNCO), and olivine type compounds ($LiMePO_4$, Me=Fe, Co, Ni, Mn).

Examples of sulfide-based positive electrode active materials include titanium sulfide ($TiS_2$), molybdenum sulfide ($MoS_2$), iron sulfide (FeS, $FeS_2$), copper sulfide (CuS), and nickel sulfide ($Ni_3S_2$).

Niobium selenide ($NbSe_3$) may also be used in addition to the positive electrode active material described above.

The positive electrode active material may be used alone or in combination.

As for the negative electrode active material, any material may be used without particular limitation as long as it may promote the battery chemical reaction accompanied by the movement of atoms employed as atoms that exhibit ionic conductivity, preferably metals that may form alloys with lithium atoms, oxides thereof, and alloys of such metals and lithium atoms, preferably lithium ions caused by lithium atoms. As for the negative electrode active material capable of intercalating and deintercalating lithium ions, any known negative electrode active material in the field of batteries may be employed without limitation.

Examples of such a negative electrode active material include metal lithium or metals that may form alloys with metal lithium, such as metal lithium, metal indium, metal aluminum, metal silicon, and metal tin, oxides of these metals, and alloys of such metals and metal lithium.

The electrode active material used in the present embodiment may have a coating layer on which the surface is coated.

Materials for forming the coating layer include ionic conductors such as nitrides and oxides of atoms, preferably lithium atoms, which exhibit ionic conductivity in a sulfide solid electrolyte, or composites thereof. Specifically, conductors having a lysicon-type crystal structure, such as $Li_{4-2x}Zn_xGeO_4$, whose main structure is lithium nitride ($Li_3N$) or $Li_4GeO_4$, conductors having a thiolysicone crystal structure such as $Li_{4-x}Ge_{1-x}PxS_4$ having a $Li_3PO_4$-type skeleton structure, conductors having a perovskite-type crystal structure such as $La_{2/3-x}Li_{3x}TiO_3$, and conductors having a NASICON-type crystal structure such as $LiTi_2(PO_4)_3$ may be mentioned.

In addition, lithium titanates such as $Li_yTi_{3-y}O_4$ (0<y<3) and $Li_4Ti_5O_{12}$ (LTO), lithium metal oxides of metals belonging to Group 5 of the periodic table such as $LiNbO_3$ and $LiTaO_3$, $Li_2O$—$B_2O_3$—$P_2O_5$ systems, $Li_2O$—$B_2O_3$—ZnO system, and other oxide-based conductors such as $Li_2O$—$Al_2O_3$—$SiO_2$—$P_2O_5$—$TiO_2$ system may be mentioned.

An electrode active material having a coating layer is obtained, for example, by adhering a solution containing various atoms constituting the material forming the coating layer on the surface of the electrode active material, and firing the adhered electrode active material at a temperature of preferably 200° C. or higher and 400° C. or lower.

As the solution containing various atoms, for example, a solution containing alkoxides of various metals such as lithium ethoxide, titanium isopropoxide, niobium isopropoxide, and tantalum isopropoxide may be used. In this case, as for the solvent, alcoholic solvents such as ethanol and butanol; aliphatic hydrocarbon solvents such as hexane, heptane, and octane; and aromatic hydrocarbon solvents such as benzene, toluene, and xylene may be used.

Further, the above adhesion may be performed by immersion or spray coating.

From the viewpoint of improving producing efficiency and battery performance, the firing temperature is preferably 200° C. or higher and 400° C. or lower, and more preferably 250° C. or higher and 390° C. or lower, and the firing time is usually about 1 minute to 10 hours, and preferably 10 minutes to 4 hours.

Based on the surface area of the electrode active material, the coverage rate of the coating layer is preferably 90% or more, more preferably 95% or more, and still more preferably 100%, that is, the entire surface is preferably covered. The thickness of the coating layer is preferably 1 nm or more, and more preferably 2 nm or more, and the upper limit is preferably 30 nm or less, and more preferably 25 nm or less.

The thickness of the coating layer may be measured by cross-sectional observation with a transmission electron microscope (TEM), and the coverage rate may be calculated from the thickness of the coating layer, the elemental analysis value, and the BET specific surface area.

Other Ingredients

In addition to the sulfide solid electrolyte and the electrode active material, the electrode mixture obtained by the production method of the present embodiment may contain other components such as a conductive material and a binder. That is, in the method of producing the electrode mixture of the present embodiment, other components such as a conductive material and a binder may be used in addition to the sulfide solid electrolyte and electrode active material described above. Other components such as a conductive agent and a binder are added to and mixed with the sulfide solid electrolyte and the electrode active material in mixing the sulfide solid electrolyte and the electrode active material.

From the viewpoint of improving battery performance by improving electronic conductivity, conductive materials include carbon-based materials such as artificial graphite, graphite carbon fiber, resin-baked carbon, pyrolytic vapor-grown carbon, coke, mesocarbon microbeads, furfuryl alcohol resin-baked carbon, polyacene, pitch-based carbon fiber, vapor-grown carbon fiber, natural graphite, and non-graphitizable carbon.

By using the binder, the strength at the time of producing the positive and negative electrodes is improved.

The binder is not particularly limited as long as functions such as binding properties and flexibility may be imparted thereto. Examples of the binder include fluorine-based polymers such as polytetrafluoroethylene and polyvinylidene fluoride, thermoplastic elastomers such as butylene rubber and styrene-butadiene rubber, and various resins such as acrylic resins, acrylic polyol resins, polyvinylacetal resins, polyvinyl butyral resins, and silicone resins.

In consideration of improving the battery performance and producing efficiency, the blending ratio (mass ratio) of the electrode active material and the sulfide solid electrolyte in the electrode mixture is preferably 99.5:0.5 to 40:60, more preferably 99:1 to 50:50, and still more preferably 98:2 to 60:40.

When a conductive material is contained, the content of the conductive material in the electrode mixture is not particularly limited. In terms of improving the battery performance and producing efficiency, the content of the conductive material is preferably 0.5% by mass or more, more preferably 1% by mass or more, and still more preferably 1.5% by mass or more, and the upper limit is preferably 10% by mass or less, preferably 8% by mass or less, and more preferably 5% by mass or less.

In addition, when a binder is contained, the content of the binder in the electrode mixture is not particularly limited. However, in terms of improving the battery performance and producing efficiency, the content of the binder in the electrode mixture is preferably 1% by mass or more, more preferably 3% by mass or more, and still more preferably 5% by mass or more, and the upper limit is preferably 20% by mass or less, more preferably 15% by mass or less, and still more preferably 10% by mass or less.

In addition, in the all-solid lithium battery using the electrode mixture obtained by the production method of the present embodiment, it is preferable that a current collector is used in addition to the positive electrode layer, the negative electrode layer, and the electrolyte layer, and known current collectors are also used. For example, a layer obtained by coating a material such as Au, Pt, Al, Ti, or Cu which reacts with the solid electrolyte, with Au may be used.

EXAMPLES

Next, the present invention will be specifically described with reference to the examples, but the present invention is not limited thereto.

Example 1

Lithium sulfide ($Li_2S$), diphosphorus pentasulfide ($P_2S_5$), lithium chloride (LiCl), and lithium bromide (LiBr) were used as raw material inclusions, and lithium carbonate ($Li_2CO_3$) was used as lithium oxoacid salt. The raw materials were coarsely pulverized by a pin mill so that the molar ratio was 1.7:0.5:1.0:0.6:0.2 ($Li_2S:P_2S_5:LiCl:LiBr:Li_2CO_3$), 0.523 g, 0.745 g, 0.284 g, 0.349 g, and 0.099 g were respectively mixed. The resulting mixture and 32 g of zirconia balls (diameter: 10 mm) were placed in a zirconia pot (volume: 45 mL) for a planetary ball mill ("Classic Line P-7 (product number)," manufactured by Fritsch Japan Co., Ltd.) and sealed under an argon atmosphere. This zirconia pot was attached to the above planetary ball mill, and after premixing for 10 minutes at a table rotation speed of 150 rpm, mixing and pulverization were performed for 15 hours at a rotation speed of 370 rpm to obtain a powdery product.

Next, the obtained powdery product was heated in an electric furnace (F-1404-A, manufactured by Tokyo Glass Instruments Co., Ltd.) in a glove box under an argon atmosphere. Specifically, a sagger made of $Al_2O_3$ (999-60S, manufactured by Tokyo Glass Instruments Co., Ltd.) was placed in an electric furnace, the temperature was raised from room temperature to 430° C. in 1 hour, and the heating temperature was set to 430° C. and heated for 2 hours. After that, the sagger was taken out from the electric furnace and slowly cooled to obtain a sulfide solid electrolyte.

Examples 2 and 3

In Example 1, a sulfide solid electrolyte was prepared in the same manner as in Example 1, except that the amounts of raw material inclusions and lithium oxoacid salt used and the heating temperature were set to the amounts used and heating temperatures illustrated in Table 1.

Comparative Example 1

A powder of Comparative Example 1 was obtained in the same manner as in Example 1, except that the lithium oxoacid salt was not used.

Comparative Example 2

In Example 1, the powder of Comparative Example 1 was obtained in the same manner as in Example 1, except that the amount of the raw material inclusion and the lithium oxoacid salt used was the amount illustrated in Table 1, and the lithium oxoacid salt was not used.

The powders obtained in the above Examples and comparative examples were subjected to ionic conductivity measurement and powder X-ray diffraction (XRD) measurement according to the following method, and AC impedance was measured by reactivity test with the positive electrode active material according to the following method. Further, solid-state $^{31}$P-NMR measurement was performed according to the following method, and the ratio of the $Li_3PO_4$ crystal structure was calculated.

Table 1 illustrates the ratio of the Argyrodite-type crystal structure and the $Li_3PO_4$ crystal structure, the ionic conductivity, and the results of the reactivity test with the positive electrode active material.

Measurement of Ionic Conductivity

In the present examples, the ionic conductivity was measured as follows.

Using the powders obtained in the examples and comparative examples, circular pellets having a diameter of 10 mm (cross-sectional area S: 0.785 cm$^2$) and a height (L) of 0.1 to 0.3 cm were molded to prepare a sample. Electrode terminals were taken from the top and bottom of the sample, and measurement was performed at 25° C. by the AC impedance method (frequency range: 1 MHz to 100 Hz, amplitude: 10 mV) to obtain a Cole-Cole plot. Near the right end of an arc observed in the high-frequency region, the real part Z' (Ω) at the point where −Z" (Ω) is the minimum was the bulk resistance R (Ω) of the electrolyte, and according to the following formula, ion conductivity σ (S/cm) was calculated.

$$R = \rho(L/S)$$

$$\sigma = 1/\rho$$

Powder X-ray Diffraction (XRD) Measurement

In this specification, powder X-ray diffraction (XRD) measurements were performed as follows.

The powders obtained in the examples and comparative examples were filled in grooves having a diameter of 20 mm and a depth of 0.2 mm, and the grooves were leveled with glass to prepare a sample. The sample was sealed with a polyimide film sold under the trademark KAPTON® for XRD and measured under the following conditions without exposure to air.

Measuring device: a benchtop X-ray diffractometer "D2 PHASER" manufactured by BRUKER AXS
    Tube voltage: 30 kV Tube current: 10 mA
    X-ray wavelength: Cu-Kα ray (1.5418 Å)
    Optical system: Concentration method
    Slit configuration: Solar slit 4° (both incident side and light receiving side), divergence slit 1 mm, Kβ filter (Ni plate 0.5%), air scatter screen 3 mm used
    Detector: Semiconductor detector
    Measuring range: 2θ=10-60 deg
    Step width, scan speed: 0.05 deg, 0.05 deg/sec

Solid $^{31}$P-NMR Measurement

About 60 mg of the powder sample obtained in the embodiments and comparative examples was filled into an NMR sample tube, and a solid $^{31}$P-NMR spectrum was obtained using the following equipment and conditions.

NMR device: ECZ400R device (manufactured by JEOL Ltd.)
    Observation core: $^{31}$P
    Observation frequency: 161.944 MHz
    Measurement temperature: room temperature (23° C.)
    Pulse sequence: Single pulse (using 90° pulse)
    90° pulse width: 3.8 μs
    Waiting time until next pulse application after FID measurement: 300 s
    Magic angle rotation speed: 12 kHz
    Accumulated times: 16 times
    Measuring range: 250 ppm to −150 ppm
    Chemical shifts: $(NH_4)_2HPO_4$ (chemical shift 1.33 ppm) was used as an external reference.

Calculation of Ratio of $Li_3PO_4$ Crystal Structure

From the NMR (solid-state $^{31}$P NMR) spectrum measured according to the solid-state $^{31}$P-NMR measurement method described above, the Argyrodite-type crystal structure peaks (i.e., 82.8 ppm, 84.6 ppm, 86.5 ppm, and 88.5 ppm) and the $Li_3PO_4$ crystal structure peaks (i.e., 9 ppm) were separated, and the ratio of the area of $Li_3PO_4$ to the total area was calculated as the ratio of the $Li_3PO_4$ crystal structure. Argyrodite-type crystal structures (peaks: 82.8 ppm, 84.6 ppm, 86.5 ppm, and 88.5 ppm) were also calculated in the same manner and used as the ratio of Argyrodite-type crystal structures.

Evaluation of Reactivity with Positive Electrode Active Material

A reactivity test with the positive electrode active material was carried out in the following procedure.

$LiNi_{0.8}Co_{0.15}Al_{0.05}O_2$(NCA) powder (d50=5.8 μm) was used as the positive electrode active material, and the powders obtained in the examples and comparative examples were used as the solid electrolyte.

The NCA powder and the solid electrolyte were weighed at a mass ratio of 70:30 and mixed in a mortar to obtain a positive electrode mixture powder. 100 mg of the obtained positive electrode mixture powder was put into a Φ10 mm cylinder made of ceramics (Machinable Ceramics (Macor (registered trademark), manufactured by Ishihara Chemical Co., Ltd.)) and molded at 550 MPa using a SUS jig. The SUS jig was fastened with bolts (fastening torque of 8 N·m) to prepare a measurement cell.

The prepared measurement cell was placed in a constant temperature bath at 70° C. After 2 hours, AC impedance (frequency range: 1 MHz to 0.1 Hz, amplitude: 10 mV) was measured using a potentio/galvanostat (manufactured by Biologic, VMP3). The cell was allowed to stand in a constant temperature bath at 70° C. for 60 hours, and the AC impedance was measured again.

The resistance values before and after standing at 70° C. were obtained from arcs observed in the obtained Cole-Cole plots.

The obtained results are illustrated in Table 1. In the measurement cell produced using the solid electrolyte powder obtained in the examples, it was confirmed that the AC impedance was smaller both before and after standing at 70° C. and the amount of increase in AC impedance before and after standing was smaller than those of the measurement cell produced using the solid electrolyte powder obtained in the comparative examples.

Regarding the sulfide solid electrolytes obtained in the examples, as illustrated in Examples 1 to 3 in Table 1 above, all of them have a $Li_3PO_4$ crystal structure, and the ratio thereof is 1.0 mol % or more and 5.0 mol % or less. Meanwhile, the presence of the $Li_3PO_4$ crystal structure was not confirmed in the powders of Comparative Examples 1 and 2 in which no lithium oxoacid salt was used. This result illustrates that the $Li_3PO_4$ crystal structure is formed due to the use of the lithium oxoacid salt. In addition, it may be seen that the presence of the $Li_3PO_4$ crystal structure exhibits high ionic conductivity and excellent reactivity with the positive electrode active material in a well-balanced manner.

FIGS. 1 and 2 are the results of X-ray diffraction (XRD) measurement of the sulfide solid electrolytes of Examples 2

TABLE 1

| | | | Example | | | Comparative Example | |
|---|---|---|---|---|---|---|---|
| | | | 1 | 2 | 3 | 1 | 2 |
| Raw material inclusion | $Li_2S$ | g | 0.523 | 0.523 | 0.500 | 0.605 | 0.510 |
| | $P_2S_5$ | g | 0.745 | 0.745 | 0.756 | 0.755 | 0.805 |
| | LiCl | g | 0.284 | 0.284 | 0.288 | 0.285 | 0.305 |
| | LiBr | g | 0.349 | 0.349 | 0.355 | 0.355 | 0.380 |
| Lithium oxoacid salt | $Li_2CO_3$ | g | 0.099 | 0.099 | 0.101 | 0.000 | 0.000 |
| | Total | g | 2.00 | 2.00 | 2.00 | 2.00 | 2.00 |
| Atom ratio | Li | mol parts | 5.4 | 5.2 | 5.0 | 5.4 | 4.6 |
| | P | mol parts | 1.0 | 1.0 | 1.0 | 1.0 | 1.0 |
| | S | mol parts | 4.2 | 4.1 | 4.0 | 4.4 | 4.0 |
| | Cl | mol parts | 1.0 | 1.0 | 1.0 | 1.0 | 1.0 |
| | Br | mol parts | 0.6 | 0.6 | 0.6 | 0.6 | 0.6 |
| Heating temperature | | ° C. | 430 | 430 | 430 | 430 | 430 |
| Ratio of Argyrodite crystal structure (82.8 ppm) | | mol % | 24.0 | 21.7 | 17.6 | 18.5 | — |
| Ratio of Argyrodite crystal structure (84.6 ppm) | | mol % | 39.5 | 45.6 | 40.0 | 43.7 | — |
| Ratio of Argyrodite crystal structure (86.5 ppm) | | mol % | 22.5 | 24.7 | 29.0 | 26.6 | — |
| Ratio of Argyrodite crystal structure (88.5 ppm) | | mol % | 11.1 | 4.8 | 10.9 | 11.2 | — |
| Ratio of $Li_3PO_4$ crystal structure | | mol % | 3.3 | 3.2 | 2.5 | 0 | 0 |
| Ionic conductivity | | mS/cm | 7.8 | 9.8 | 9.8 | 12.3 | 0.07 |
| Results of reactivity test with positive electrode active material (2 hours later) | | Ω | 75 | 110 | 116 | 332 | — |
| Results of reactivity test with positive electrode active material (60 hours later) | | Ω | 102 | 155 | 143 | 434 | — |

From the results of the above examples, it was confirmed that the sulfide solid electrolyte having a stable crystalline phase obtained by the production method of the present embodiment has high ionic conductivity and excellent reactivity with the positive electrode active material. Meanwhile, the powder obtained in Comparative Example 1 may be a sulfide solid electrolyte having ionic conductivity. However, according to the reactivity test results, the powder of Comparative Example 1 has a larger AC impedance than the powder of the examples, and the increase in the amount after 2 hours to 60 hours is large, indicating that the reactivity with the positive electrode active material is low. In addition, the powder of Comparative Example 2 had extremely low ionic conductivity.

and 3, respectively. As illustrated in FIGS. 1 and 2, since the XRD spectra of the sulfide solid electrolytes of Examples 1 and 2 have peaks at 2θ=25.0°, 30.0°, 47.0°, and 52.0°, it was confirmed that the sulfide solid electrolytes have the Argyrodite-type crystal structure as a main crystal. In addition, since the XRD spectra of the sulfide solid electrolytes of Examples 2 and 3 have peaks at 2θ=22.1° and 23.1°, it was also confirmed that they have a $Li_3PO_4$ crystal structure.

According to the NMR spectra of the sulfide solid electrolytes of Examples 1 to 5 (not illustrated), the peaks of the Argyrodite-type crystal structure (i.e., 82.8 ppm, 84.6 ppm, 86.5 ppm, and 88.5 ppm) and the peak of the $Li_3PO_4$ crystal structure (i.e., 5 to 9 ppm) are present, and it was also confirmed that it has an Argyrodite-type crystal structure as a main crystal and also has a $Li_3PO_4$ crystal structure. This result agrees with the results from the XRD spectrum described above. It was also confirmed that the proportion of the $Li_3PO_4$ crystal structure in the total crystals of the sulfide solid electrolytes of Examples 1, 3, and 5 was 1.0 mol % or more and 5.0 mol % or less.

Industrial Applicability

According to a method of producing a sulfide solid electrolyte of the present embodiment, a sulfide solid electrolyte having high ionic conductivity, excellent reactivity with a positive electrode active material, and having a stable crystalline phase may be produced. The sulfide solid electrolyte having a stable crystalline phase and the electrode mixture obtained by the production method of the present embodiment are suitably used in batteries, especially in information-related devices such as personal computers, video cameras, and mobile phones, and communication devices.

The invention claimed is:

1. A method of producing a sulfide solid electrolyte having a stable crystalline phase, the method comprising:
   mixing a raw material inclusion containing a lithium atom, a phosphorous atom, a sulfur atom, and a halogen atom with lithium carbonate and optionally at least one lithium oxoacid salt selected from the group consisting of lithium nitrate, lithium nitrite, lithium silicate, and lithium borate, thereby obtaining a mixture,
   wherein a number of moles of lithium carbonate and the optional at least one lithium oxoacid salt is 1.0 mol parts or more and 10.0 mol parts or less with respect to 100 mol parts of lithium atoms contained in the raw material inclusion, and
   the sulfide solid electrolyte contains $Li_3PO_4$ crystal structure in an amount of 1.0 mol % or more and 5.0 mol % or less, relative to total crystals contained in the sulfide solid electrolyte.

2. The method according to claim 1, wherein the raw material inclusion contains lithium sulfide.

3. The method according to claim 1, wherein the raw material inclusion contains phosphorus sulfide.

4. The method according to claim 1, wherein the raw material inclusion contains at least one halogen-containing compound selected from the group consisting of a lithium halide and an elemental halogen.

5. The method according to claim 1, wherein the lithium atom, the sulfur atom, the halogen atom, and the phosphorous atom contained in the mixture of the raw material inclusion, lithium carbonate, and the optional at least one lithium oxoacid salt satisfy following formulas (1) to (3):

$$4.8 \leq \text{lithium atom/phosphorous atom (molar ratio)} \leq 5.6 \tag{1},$$

$$3.8 \leq \text{sulfur atom/phosphorous atom (molar ratio)} \leq 4.4 \tag{2, and}$$

$$1.2 \leq \text{halogen atom/phosphorous atom (molar ratio)} \leq 2.0 \tag{3}.$$

6. The method according to claim 1, wherein the mixing is performed using a pulverizer.

7. The method according to claim 1, further comprising:
   heating the mixture obtained by the mixing.

8. The method according to claim 1, wherein the sulfide solid electrolyte is a sulfide solid electrolyte having an Argyrodite-type crystal structure.

9. A method of producing an electrode mixture, the method comprising:
   obtaining a sulfide solid electrolyte having a stable crystalline phase from a mixture, which is obtained by mixing a raw material inclusion containing a lithium atom, a phosphorous atom, a sulfur atom, and a halogen atom with lithium carbonate and optionally at least one lithium oxoacid salt selected from the group consisting of lithium nitrate, lithium nitrite, lithium silicate, and lithium borate; and
   mixing the sulfide solid electrolyte and an electrode active material,
   wherein a number of moles of lithium carbonate and the optional at least one lithium oxoacid salt is 1.0 mol parts or more and 10.0 mol parts or less with respect to 100 mol parts of lithium atoms contained in the raw material inclusion, and
   the sulfide solid electrolyte contains $Li_3PO_4$ crystal structure in an amount of 1.0 mol % or more and 5.0 mol % or less, relative to total crystals contained in the sulfide solid electrolyte.

10. The method according to claim 9, wherein the sulfide solid electrolyte having the stable crystalline phase is obtained by heating the mixture.

11. The method according to claim 9, wherein the sulfide solid electrolyte has an Argyrodite-type crystal structure.

12. The method according to claim 7, wherein the heating is performed in an inert gas atmosphere or a reduced pressure atmosphere.

13. The method according to claim 10, wherein the heating is performed in an inert gas atmosphere or a reduced pressure atmosphere.

* * * * *